US007899106B2

(12) United States Patent
Camp, Jr.

(10) Patent No.: US 7,899,106 B2
(45) Date of Patent: Mar. 1, 2011

(54) MITIGATING OFDM RECEIVER INTERFERENCE CAUSED BY INTERMITTENT SIGNAL TRANSMISSION

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1065 days.

(21) Appl. No.: 11/468,822

(22) Filed: Aug. 31, 2006

(65) Prior Publication Data

US 2008/0056391 A1 Mar. 6, 2008

(51) Int. Cl.
*H04B 1/00* (2006.01)
(52) U.S. Cl. .................................................. 375/134
(58) Field of Classification Search .................. 375/134, 375/130, 340, 232, 326, 316; 348/714, 715, 348/716; 455/562.1; 370/203
See application file for complete search history.

(56) References Cited

U.S. PATENT DOCUMENTS

| 6,587,157 | B1 * | 7/2003 | Guyot et al. | 348/714 |
| 7,310,503 | B2 * | 12/2007 | Ido | 455/140 |
| 7,436,757 | B1 * | 10/2008 | Wilson et al. | 370/203 |
| 2005/0265490 | A1 * | 12/2005 | Sestok et al. | 375/340 |
| 2006/0088133 | A1 | 4/2006 | Chen et al. | |

FOREIGN PATENT DOCUMENTS

| EP | 1650921 | 4/2006 |
| EP | 1672909 | 6/2006 |
| FR | 2817689 | 6/2002 |
| WO | WO2005034460 | 4/2005 |

OTHER PUBLICATIONS

International Search Report w/ Written Opinion, International Application No. PCT/US2007/065402, Mailing Date: Nov. 9, 2007.
Pekowsky, Stuart et al. "DVB-H Architecture for Mobile Communications Systems." www.rfdesign.com, Apr. 2005. http://rfdesign.com/mag/radio_dvbh_architecture_mobile/.
Schwoerer, Ludwig et al. "Fast Scattered Pilot Synchronization for DVB-T and DBV-H." Proc. 8th International OFDM Workshop, Hamburg, Germany, Sep. 24/25, 2003.

(Continued)

*Primary Examiner*—Khai Tran
(74) *Attorney, Agent, or Firm*—Coats & Bennett, P.L.L.C.

(57) ABSTRACT

Degradation of the OFDM signal carrying DVB-H content, caused by GSM burst transmission, is overcome without the need for hardware to constrain the GSM transmission spectrum by the modulating of the OFDM signal and utilizing the interleaving and Forward Error Correction (FEC) defined in the DVB-H standard to correct the errors caused by GSM transmission interference. A pattern in time and frequency of the scattered pilots in the OFDM signal is detected during a period of no burst transmission. During burst transmissions from the transmitter, scattered pilots are inserted into the received OFDM signal according to the pattern. An FFT demodulator utilizes the inserted scattered pilots to perform frame synchronization when the OFDM signal is degraded by interference from the burst transmission. The demodulated signal is de-interleaved, and bit errors due to the burst transmission interference are corrected by FEC decoders.

14 Claims, 5 Drawing Sheets

OTHER PUBLICATIONS

Mohorcic, Michael et al. "Selection of Broadband Communication Standard for High-Speed Mobile Scenario." FP6-IST-2003-506745 Capanina, Jan. 31, 2005, pp. 95-98.

Gupta, Vikas. "Use Digital Video Broadcasting-Handheld (DVB-H) in Wireless and Mobile Networks." http://www-128.ibm.com/developerworks/library/wi-3gwifi/index.html. May 12, 2006.

Pekowsky, Stuart et al. "DVB-H Reception on Portable Handsets." Portable Design, Oct. 1, 2005.

Section 4.4 of ETSI EN 300 744 V1.5.1 (Nov. 2004)—(Digital Video Broadcasting (DVB); Framing Structure, Channel Coding and Modulation for Digital Terrestrial Television).

* cited by examiner

MITIGATING OFDM RECEIVER INTERFERENCE CAUSED BY INTERMITTENT SIGNAL TRANSMISSION

BACKGROUND

The present invention relates generally to the field of wireless communication and in particular to a system and method of mitigating RF interference experienced by an OFDM receiver in a portable electronic device from RF signals intermittently transmitted by the device.

Digital Video Broadcast-Terrestrial (DVB-T) is a well-defined standard for the broadcast of video content in digital format. DVB-T utilizes Orthogonal Frequency Domain Multiplexing (OFDM) modulation. DVB-H (Handheld) is a recent extension of the DVB-T standard that optimizes digital video transmission to portable (handheld) electronic devices, including wireless communication system mobile terminals. The DVB-H extensions include time slicing to reduce power consumption at the receiver, IP datacasting for lower-resolution video streaming, multiprotocol encapsulation-forward error correction (MPE-FEC) for more robust signal reception, and a 4K OFDM carrier mode (in addition to the 2K and 8K modes defined for DVB-T) for wireless network optimization. DVB-H can transmit MPEG-4 video streams at 11 Mbits/sec, allowing 30-35 video streams to portable devices at 150-400 kbits/sec, sufficient to render acceptable quality video resolution on small screens.

In the US, DVB-H will occupy an approximately 5-MHz segment of the L-band, which spans approximately 0.39 to 1.55 GHz. In one implementation, the upper end of the spectrum required for DVB-H is approximately 750 MHz, providing at least 75 MHz separation from the lower end of the spectrum required for the transmission of GSM bursts (825 MHz in the US; 880 MHz in Europe) in mobile terminals supporting the Global System for Mobile Communications (GSM). The periodic GSM communication signal transmission bursts (0.576 msec burst within every 4.6 msec frame) do not directly interfere with DVB-H reception. However, as well known in the art, mobile terminal transmitters exhibit frequency roll off, wherein attenuated RF energy is emitted outside of a bandpass frequency boundary, rather than the ideal complete suppression of all RF energy past the frequency boundary. Accordingly, some RF energy from GSM communication transmissions may "leak" into the DVB-H reception frequencies, causing interference.

To avoid such interference, a Surface Acoustic Wave (SAW) filter may be incorporated into the mobile terminal transceiver design, providing a sharper frequency roll off for the GSM burst transmissions. However, a SAW filter increases the transceiver design complexity, and both increases cost and reduces reliability by adding an additional component. Furthermore, the filter introduces loss and causes the GSM power amplifier to operate at a higher output power, reducing battery life. Particularly since not all mobile terminals will receive DVB-H signals, it would be advantageous to reduce or eliminate the deleterious effects of GSM burst transmissions on DVB-H signal reception, without the need for a SAW filter.

SUMMARY

According to one or more embodiments disclosed and claimed herein, a pattern in time and frequency of the scattered pilots is detected when the OFDM signal is received without interference from a transmitter. During burst transmissions from the transmitter, scattered pilots are inserted into the received OFDM signal according to the pattern. An FFT demodulator utilizes the inserted scattered pilots to perform frame synchronization when the OFDM signal is degraded by interference from the burst transmission. The demodulated signal is de-interleaved, and bit errors due to the burst transmission interference are corrected by FEC decoders.

In one embodiment, the present invention relates to a method of mitigating OFDM receiver interference caused by intermittent signal transmission. During a period of no signal transmission, scattered pilots are detected in a received OFDM signal and a pattern of the scattered pilots in time and frequency is deduced. During a period of signal transmission, scattered pilots are inserted into the received OFDM signal according to the pattern. The inserted scattered pilots are used to recover information from the OFDM signal when it is degraded by interference from the signal transmission.

In another embodiment, the present invention relates to a mobile terminal. The mobile terminal includes a transceiver operative to receive an OFDM signal and further operative to intermittently transmit signals. The mobile terminal also includes an FFT demodulator operative to demodulate the OFDM signal using scattered pilots therein for frame synchronization. The mobile terminal further includes a controller operative to deduce a pattern of the scattered pilots in time and frequency in the OFDM signal during a period of no signal transmission, and further operative to insert scattered pilots into the received OFDM signal according to the pattern, prior to demodulation, during a period of signal transmission. The FFT demodulator uses the inserted scattered pilots to demodulate the OFDM signal when it is degraded by interference from the signal transmission.

DETAILED DESCRIPTION

Figure 1:
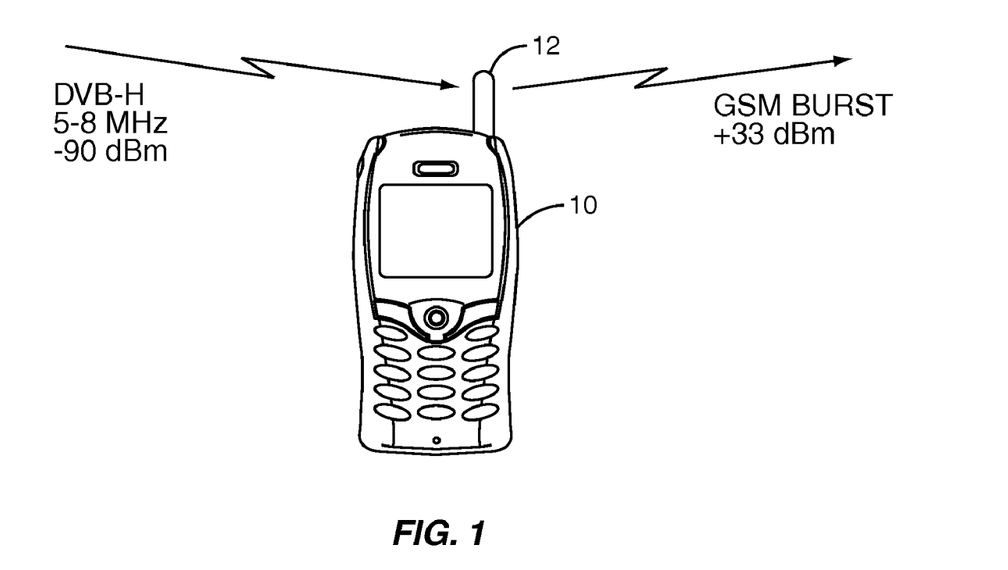
FIG. 1 depicts a mobile terminal.
Figure 2:
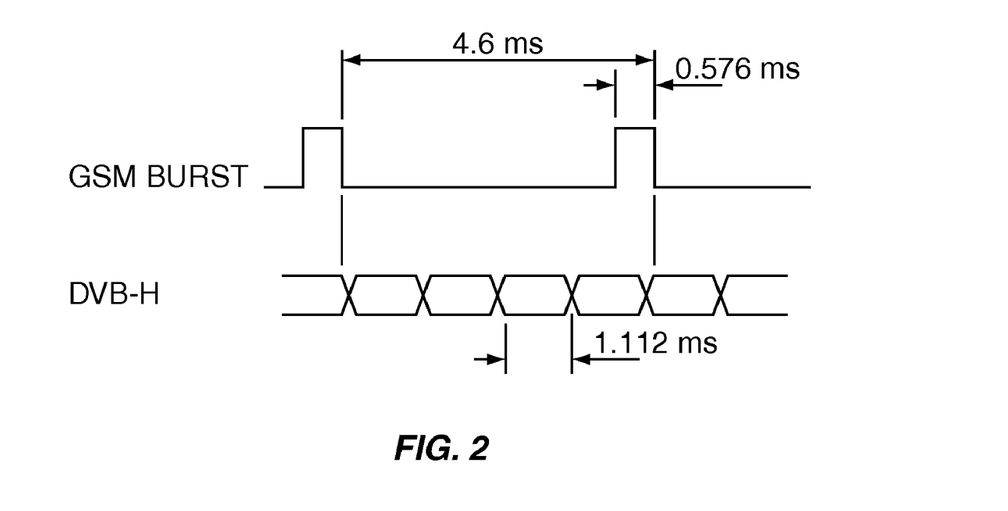
FIG. 2 is a timing diagram of a GSM burst signal and a DVB-H signal.

FIG. 1 depicts a wireless communication system mobile terminal 10 having an antenna 12. The mobile terminal 10 receives DVB-H broadcasts in the L-band, over approximately 5-8 MHz at −90 dBm. The mobile terminal 10 additionally receives and transmits wireless communication signals. In particular, the mobile terminal 10 depicted in FIG. 10 conforms to the GSM protocol, a time division multiple access (TDMA) system. Accordingly, the mobile terminal 10 transmits communication signals in a periodic burst, at +33 dBm. As depicted in FIG. 2, the GSM frame period is 4.6 msec, with a burst transmission of 0.576 msec, for a duty cycle of approximately ⅛.

Figure 3:
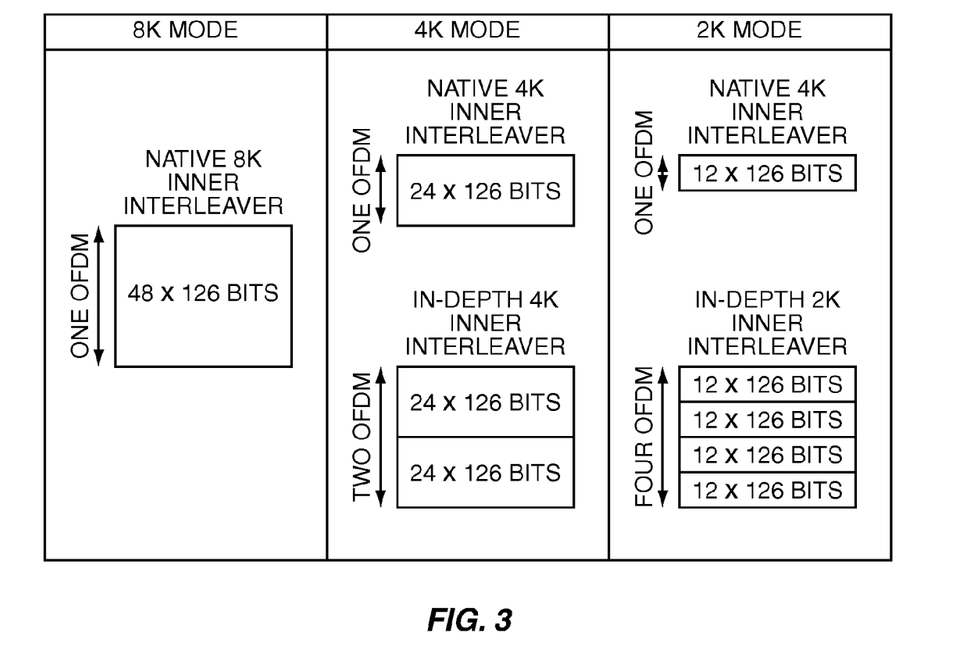
FIG. 3 is a block diagram of in-depth interleaver operation.

DVH-B defines three modes of OFDM operation: 2K, 4K, and 8K. The duration of a symbol varies with the mode: 0.28 msec for the 2K mode and 1.12 msec for the 8K mode, both with ¼ period guard intervals. FIG. 3 depicts the effects of an "in-depth interleaver" for the 2K and 4K modes, which extends the symbol duration in these modes to match that of the 8K mode-1.112 msec. The in-depth interleaver is defined in sections F4.3.4 and F4.3.4.2.2 of the DVB-H Specification, ETSI EN 300 744 V1.5.1 (2004). Use of the in-depth interleaver is assumed for the purpose of this discussion; accordingly, all DVB-H symbols are assumed to have durations of 1.112 msec.

As depicted in FIG. 2, a maximum of slightly more than four DVB-H symbols may be received in a single GSM frame period. Depending on the relative timing of the GSM signal and the DVB-H symbols, one or two of the DVB-H symbols will experience interference from the GSM burst. On the other hand, at least two and up to three DVB-H symbols will be received without interference during each GSM frame period. The DVB-H signal is encoded with a Forward Error Correction rate of ⅔. Assuming that the interference results in the loss of all interfered DVB-H bits, ⅛ of the DVB-H bits will be lost (corresponding to the ⅛ duty cycle of the GSM signal), or 12.5% of the bits falling within each GSM frame period. If the FEC coding rate used for the DVB-H transmission had been rate ⅔, then the effective rate due the corrupted or lost bits would be rate ¾.

Figure 4A:
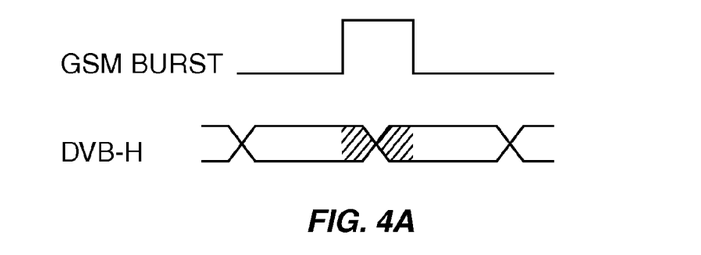
FIGS. 4A and 4B are timing diagrams depicting a GSM burst signal interfering with one or more DVB-H symbols.
Figure 4B:
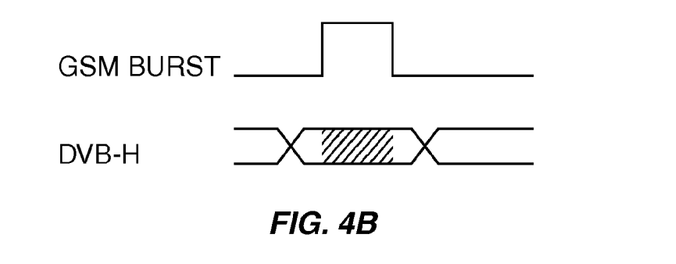

In greater detail, FIGS. 4A and 4B depict the interference possibilities. In FIG. 4A, the GSM burst precisely "straddles" two DVB-H symbols. The GSM burst is 0.576 msec; half of the burst is 0.288 msec. The interference in this case may cause a loss of up to 0.288/1.112=0.26, or 26% of the DVB-H symbol. This is the minimum interference experienced by the most-interfered of the pair of DVB-H symbols. FIG. 4B depicts the greatest level of interference, where the GSM burst is entirely within a single DVB-H symbol. In this case, the interference may cause 0.576/1.112=0.52 or 52% of the bits to be lost.

The DVB-T specification (from which the DVB-H specification is derived) defines OFDM frames, each having a duration of $T_F$ and comprising 68 OFDM symbols. Each signal is constituted by a set of K carriers, where K=1705 in the 2K mode, K=3409 in the 4K mode, and K=6817 in the 8K mode. Each symbol comprises a useful part and a guard interval containing a cyclic continuation of the useful part. Since the OFDM signal comprises many separately-modulated carriers, each symbol can be considered to be divided into cells, each cell corresponding to the modulation carried on one carrier during one symbol. In addition to transmitted data, an OFDM frame includes scattered pilot cells, continual pilot carriers, and TPS (Transmission Parameters Signaling) carriers.

Figure 5:
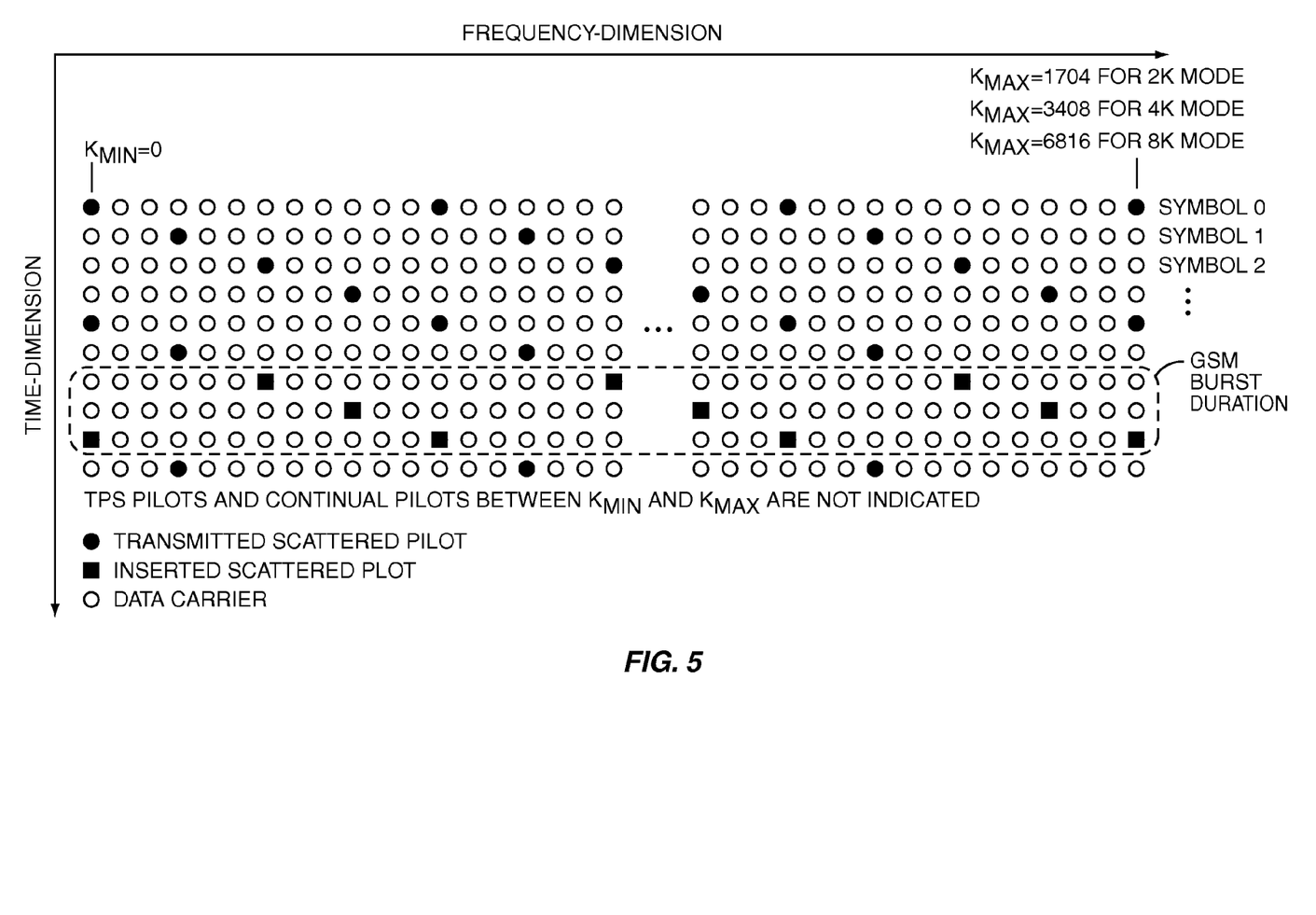
FIG. 5 is a scattered pilot diagram.

FIG. 5 depicts this symbol structure, with the scattered pilot cells, also referred to herein as simply "scattered pilots"—shown as solid circular icons (continual pilots and TPS pilots are omitted for clarity). The scattered pilots assist receivers in synchronizing a Fast Fourier Transform (FFT) demodulator to the DVB signal, and additionally assist in frame synchronization, frequency synchronization, time synchronization, channel estimation, transmission mode identification, and can also be used to follow the phase noise. For the OFDM symbol of index I (ranging from 0 to 67), carriers for which index k belongs to the subset {k=$K_{min}$+3 (I mod 4)+12p|p integer, p>=0, k∈[$K_{min}$, $K_{max}$]} are scattered pilots, where p is an integer that takes all possible values greater than or equal to zero, provided that the resulting value for k does not exceed the valid range [$K_{min}$, $K_{max}$]. $K_{max}$ is 1704 for the 2K mode, 3408 for the 4K mode and 6816 for the 8K mode.

The duration indicated in FIG. 5 by the dashed line indicates a GSM burst, during which interference may cause the loss of some or all of the scattered pilots and data carriers. According to the present invention, the DVB-H receiver detects the pattern of scattered pilots in time and frequency during a period of no GSM burst interference. Subsequently, during a period of GSM burst interference, the receiver inserts scattered pilots into the DVB-H symbols, in accordance with the previously detected pattern. The inserted scattered pilots are indicated in FIG. 5 by solid square icons. The FFT demodulator may utilize the inserted scattered pilots to synchronize to the DVB-H signal, even if the transmitted scattered pilots are obscured by GSM burst interference.

Data in the DVB-H signal are interleaved, to minimize the deleterious effects of fading and/or interference. Accordingly, where two or more adjacent DVB-H symbols are degraded by GSM burst interference, the degraded symbols will be re-ordered (de-interleaved) prior to FEC decoding. This technique spreads bit errors, increasing the ability of the FEC decoder to detect and correct the errors.

Figure 6:
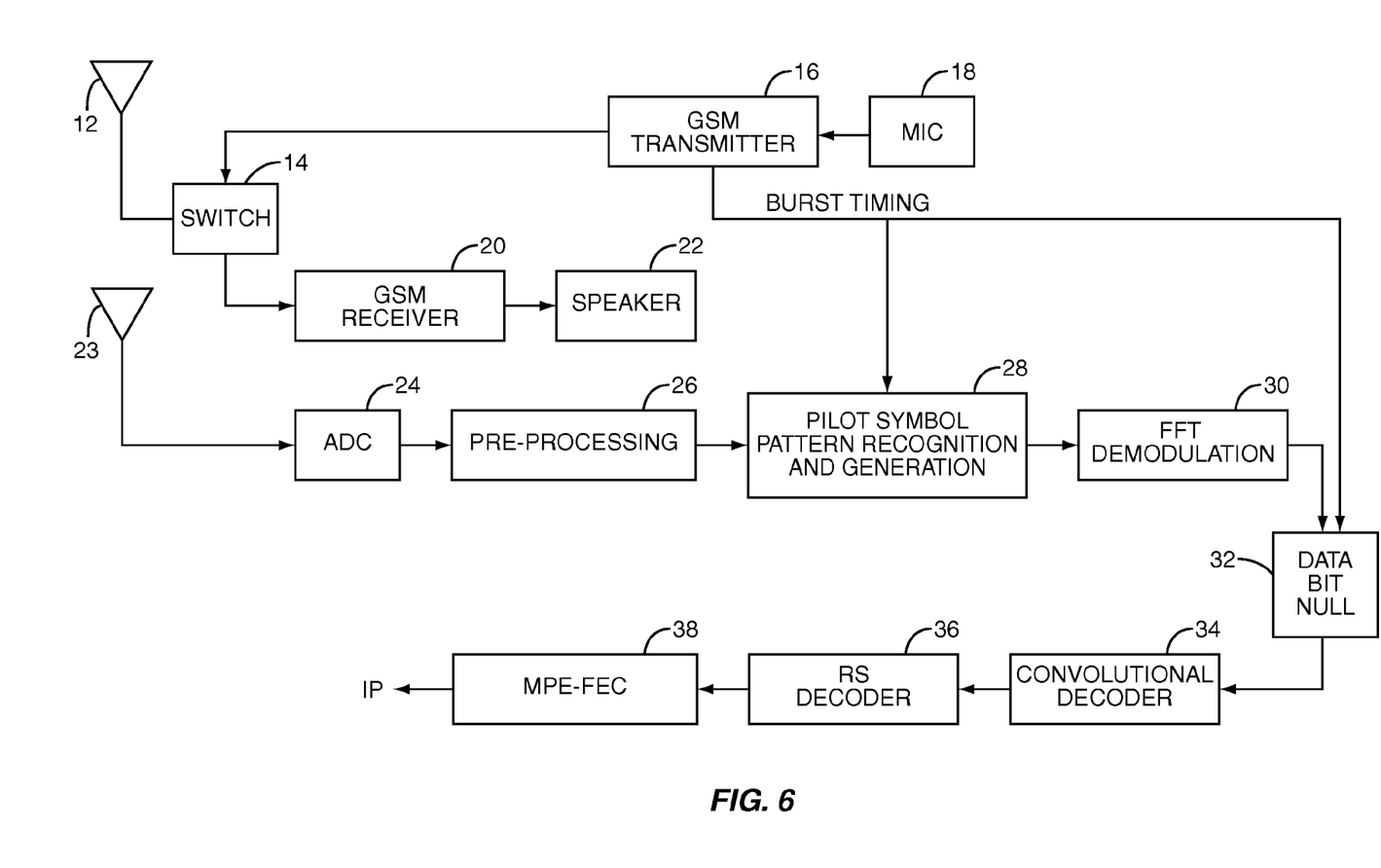
FIG. 6 is a functional block diagram of a transceiver for the mobile terminal of FIG. 1.

FIG. 6 depicts a functional block diagram of a transceiver for a mobile terminal 10. The antenna 12 is connected to a switch 14 that alternately connects the antenna to a transmitter or receiver. A GSM transmitter 16 (the details of which are not relevant) transmits voice signals, such as from a microphone 18, in a TDMA burst. The GSM transmitter 16 generates and outputs signals indicative of the timing of GSM burst transmissions. A GSM receiver 20 receives signals from the antenna 12 through the duplexer 14, and demodulates, decodes, and converts the signals to analog voice audio, which is output to a speaker 22. As well known in the art, the GSM transmitter 16 and GSM receiver 20 may additionally send and receive digital data.

Connected to a second antenna 23 is a DVB-H receiver. In general, the isolation between the GSM antenna 12 and the DVB-H antenna 23 is insufficient to reduce interference from the GSM transmitter 16 to below the noise floor of the DVB-H receiver. The DVB-H receiver comprises an Analog-to-Digital Converter (ADC) 24, preprocessing unit 26, pilot symbol pattern recognition and generation unit 28, FFT demodulator 30, data bit null unit 32, convolutional decoder 34, Reed-Solomon (RS) decoder 36, and Multiprotocol Encapsulation-Forward Error Correction (MPE-FEC) decoder 38. The preprocessing unit 26 may perform a variety of functions, including IQ impairments and surrounding noise compensation, filtering and interpolation, guard time removal, preliminary synchronization, and the like.

The pilot symbol pattern recognition and generation unit 28 is depicted in FIG. 6 as a functional block. In a given embodiment, this functionality may be provided by an appropriately programmed controller, microprocessor, or DSP connected to memory; it may be implemented in hardware, such as an ASIC or FPGA; or it may comprise any combination of hardware, firmware, and software, as determined by system designers for implementation in any particular application. Functionally, the pilot symbol pattern recognition and generation unit 28 monitors the scattered pilots in the OFDM signal during periods of no interference from the GSM transmitter 16, and detects and records the pilot symbol pattern in time and frequency. During periods of GSM burst transmission, as indicated in some embodiments by burst timing signals from the GSM transmitter 16, the pilot symbol pattern recognition and generation unit 28 generates scattered pilots and inserts them into the OFDM signal according to the detected pattern.

The FFT demodulator 30 demodulates OFDM symbols. The output of the FFT demodulator 30 may comprise a sequence of hard bits (e.g., 0 s and 1 s). Alternatively, the FFT demodulator 30 may comprise the value −1 indicating a 0, and +1 indicating a 1. In some embodiments, the output may be "soft" bits, assuming various values between 0 and −1 or +1 to indicate a certainty or confidence factor that the corresponding bit is a 0 or 1, respectively.

According to one embodiment, a data bit null unit 32—the functionality of which may be provided in hardware, firmware, or software as described above—"nulls" the output bits of the FFT demodulator 30 during periods of GSM burst transmission. That is, the data bit null unit 32 substitutes a value of 0.5 for each FFT demodulator 30 output of hard bit of 0 or 1. Similarly, for FFT demodulator 30 output bits of −1 and +1, the data bit null unit 32 substitutes a null value of 0. Nulling the interfered bits may improve the performance of the FEC decoder during GSM burst interference.

In one embodiment, the data bit null unit 32 may selectively null the FFT demodulator 30 output based on the signal level of the DVB-H signal, as compared to prior DVB-H signals. If the DVB-H signal level is sufficiently large that it would only be slightly affected by the GSM transmit burst—that is, the output bits of the FFT demodulator 30 are largely correct even during periods of GSM burst transmission—the data bit null unit 32 may be disabled, and the FFT demodulator 30 outputs passed directly to the decoders 34, 36, 38. Alternatively, if the DVB-H signal is weak, the data bit null unit 32 may null the FFT demodulator 30 output bits, and allow the FEC decoders 34, 36, 38 to recreate them.

The convolutional decoder 34, such as a Viterbi decoder, and Reed-Solomon decoder 36 are well known in the art, and are specified in the DVB-T standard. The DVB-H extensions added the MPE-FEC decoder 38, which de-interleaves the data and provides another level of error correction. The MPE-FEC decoder 38 decodes data in a variety of protocols, outputting a stream of IP packets. Other functions of the DVB-H receiver, such as synchronization, TPS acquisition, channel estimation, equalization, and the like, are omitted from FIG. 6 for clarity.

Figure 7:
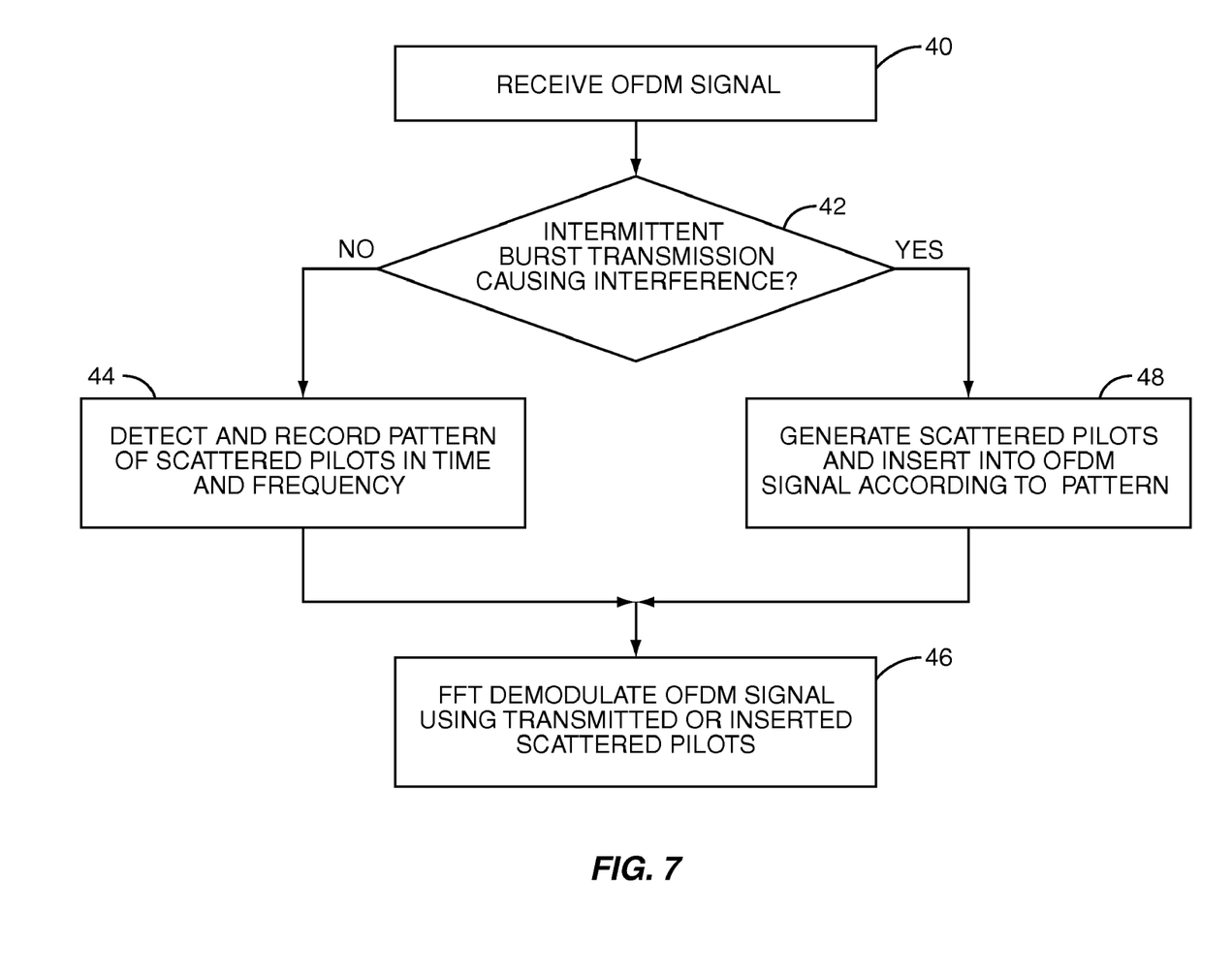
FIG. 7 is a flow diagram of a method of enhanced DVB-H reception.

FIG. 7 depicts a process of receiving DVB-H signals in the presence of intermittent transmission interference, and flow diagram form. The DVB-H signal is received as an OFDM transmission (block 40). During periods of no interference from burst transmissions (block 42), the receiver detects and records the pattern of scattered pilots in the OFDM symbols, in time and frequency (block 46). During periods of interference from intermittent burst transmissions (block 42), the receiver generates and inserts scattered pilots into the OFDM symbols, according to the detected pattern. The receiver then FFT demodulates the OFDM signal, using the transmitted scattered pilots during periods of no interference, and the inserted scattered pilots during periods of interference caused by intermittent burst transmissions (block 48).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of mitigating OFDM receiver interference in a wireless communication system mobile terminal caused by intermittent signal transmission by the mobile terminal, comprising:

during a period of no signal transmission by the mobile terminal, detecting scattered pilots in an OFDM signal received by the mobile terminal and deducing a pattern of the scattered pilots in time and frequency in the received OFDM signal;

during a period of signal transmission by the mobile terminal, inserting the scattered pilots into the received OFDM signal according to the deduced pattern; and using the inserted scattered pilots to recover information from the OFDM signal when it is degraded by interference from the signal transmission by the mobile terminal.

2. The method of claim 1 wherein the scattered pilots comprise a bit pattern known to the receiver.

3. The method of claim 1 wherein using the inserted scattered pilots to recover information from the OFDM signal comprises performing Fast Fourier Transform (FFT) demodulation operations using the inserted scattered pilots for frame synchronization.

4. The method of claim 3 further comprising selectively nulling the FFT output during the time the OFDM signal was subjected to interference from the signal transmission.

5. The method of claim 4 further comprising monitoring the OFDM signal strength during a period of no signal transmission, and nulling the FFT output during a period of signal transmission if the OFDM signal strength during the period of signal transmission is less than it was during the period of no signal transmission.

6. The method of claim 1 wherein an OFDM receiver is disposed in a wireless communication system mobile terminal including a transmitter operative to intermittently transmit communication signals.

7. The method of claim 6 wherein the mobile terminal conforms to the GSM wireless communication protocol.

8. A mobile terminal operative in a wireless communication system, comprising:

a receiver operative to receive an OFDM signal;

a transmitter operative to transmit a wireless communication signal;

an FFT demodulator operative to demodulate the received OFDM signal using scattered pilots therein for frame synchronization; and a controller operative to deduce a pattern of the scattered pilots in time and frequency in the received OFDM signal during a period of no signal transmission by the transmitter, and further operative to insert the scattered pilots into the received OFDM signal according to the pattern, prior to demodulation, during a period of signal transmission by the transmitter;

whereby the FFT demodulator uses the inserted scattered pilots to demodulate the received OFDM signal when it is degraded by interference from the signal transmission by the transmitter.

9. The mobile terminal of claim 8 wherein the scattered pilots comprise a bit pattern known to the mobile terminal.

10. The mobile terminal of claim 8 wherein the FFT demodulator using the inserted scattered pilots to demodulate the OFDM signal comprises the FFT demodulator performing frame synchronization based on the inserted scattered pilots.

11. The mobile terminal of claim 8 further comprising a data bit null unit operative to selectively null output of the FFT demodulator during the time the OFDM signal was subjected to interference from the signal transmission.

12. The mobile terminal of claim 11 wherein the data bit null unit comprises the controller.

13. The mobile terminal of claim 11 wherein the controller is further operative to monitor the OFDM signal strength during a period of no signal transmission, and wherein the data bit null unit nulls the FFT output during a period of signal transmission if the OFDM signal strength during the period of signal transmission is less than it was during the period of no signal transmission.

14. The mobile terminal of claim 8 wherein the mobile terminal complies with the GSM wireless communication protocol.

* * * * *